J. A. HAFFNER.
EMERGENCY AXLE ATTACHMENT.
APPLICATION FILED JAN. 15, 1920.
1,379,558.
Patented May 24, 1921.
2 SHEETS—SHEET 1.
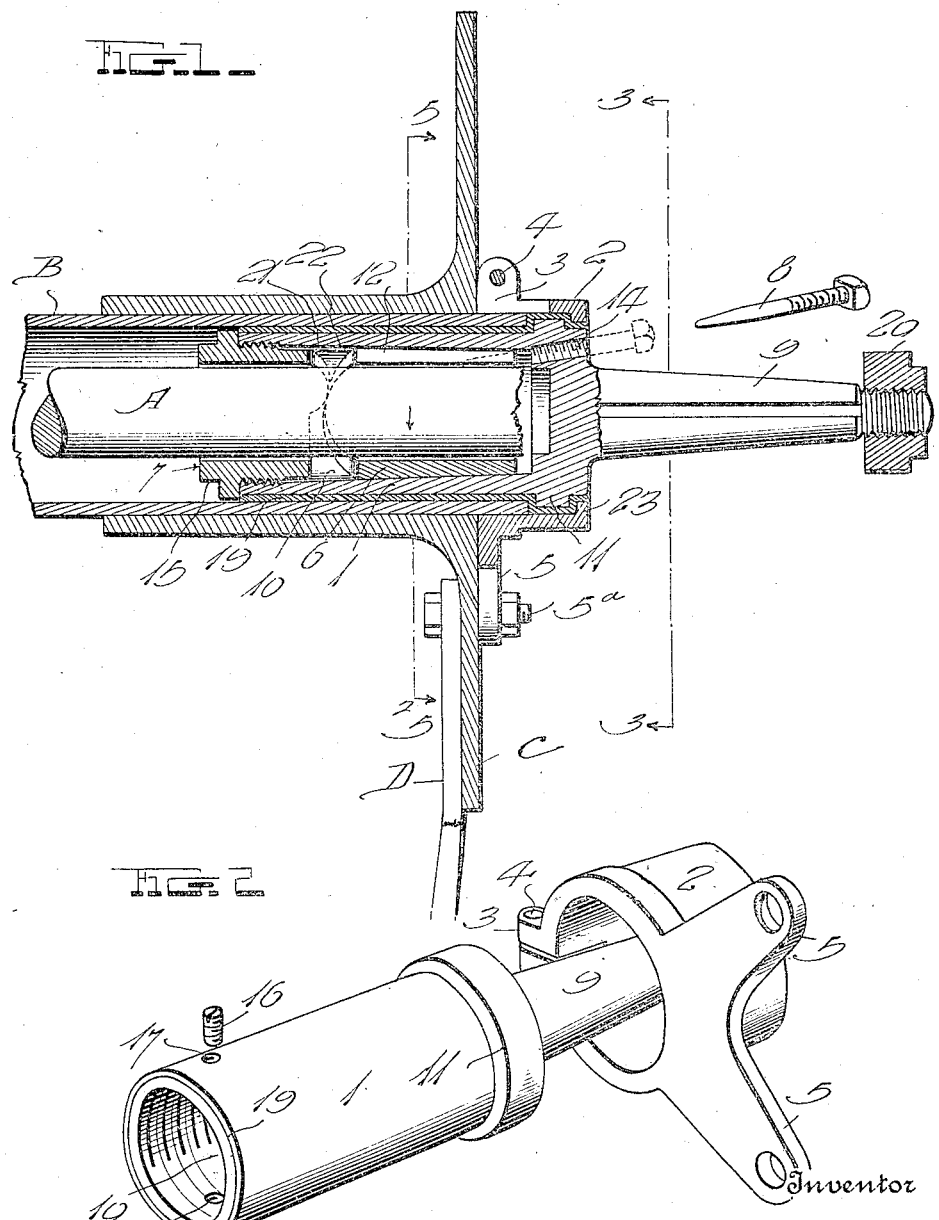

J. A. HAFFNER.
EMERGENCY AXLE ATTACHMENT.
APPLICATION FILED JAN. 15, 1920.
1,379,558.
Patented May 24, 1921.
2 SHEETS—SHEET 2.
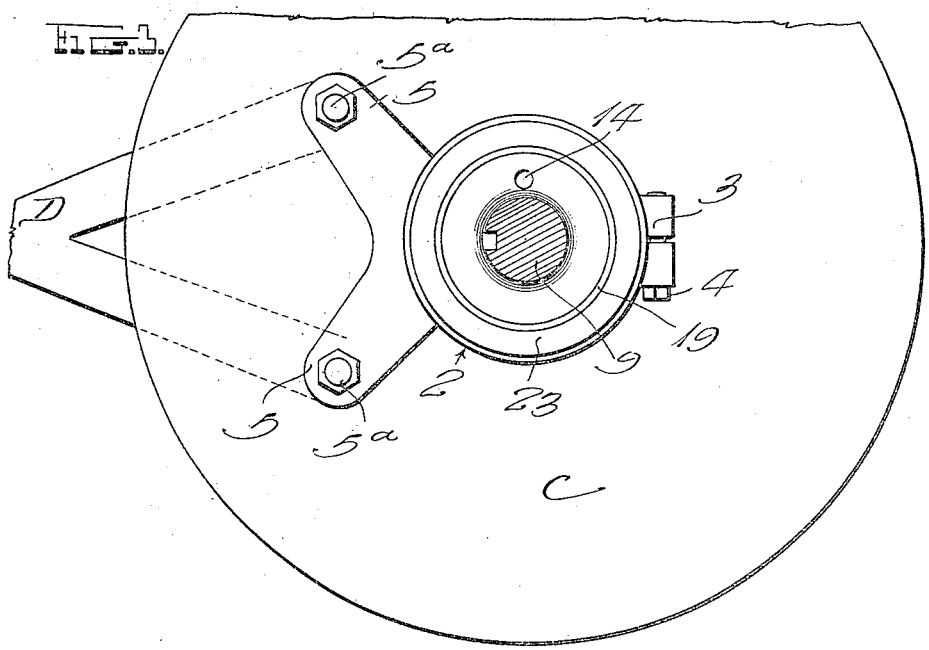
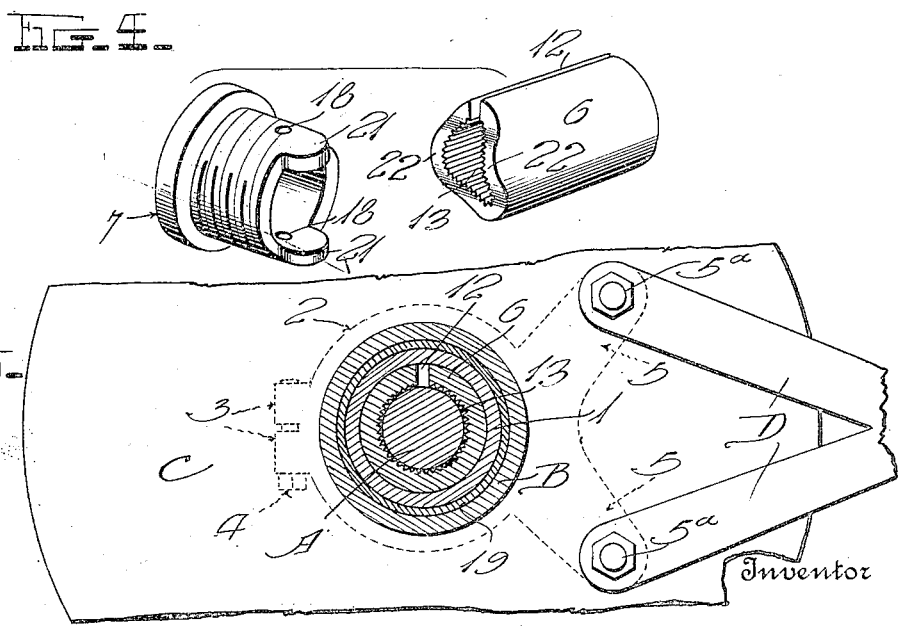
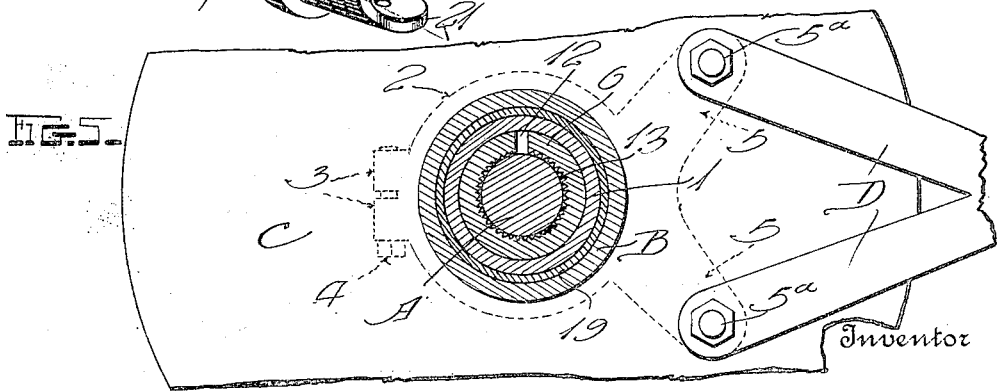
Inventor
J. A. Haffner

UNITED STATES PATENT OFFICE.

JULIUS ANTON HAFFNER, OF LIMA, MONTANA.

EMERGENCY AXLE ATTACHMENT.

1,379,558.  Specification of Letters Patent.  Patented May 24, 1921.

Application filed January 15, 1920. Serial No. 351,724.

*To all whom it may concern:*

Be it known that I, JULIUS A. HAFFNER, a citizen of the United States, residing at Lima, in the county of Beaverhead and State of Montana, have invented certain new and useful Improvements in Emergency Axle Attachments; and I do declare the following to be a full, clear, and exact description of the invention, such as will enable others skilled in the art to which it appertains to make and use the same.

This invention relates to emergency axle attachments, and more specifically to an improved automatically clamping attachment for repairing broken automobile axles.

The main object of this invention is to generally improve upon devices of this character by providing an improved structure which automatically clamps an axle on which it is placed, in consequence of the rotary movement imparted to the axle by the motive power of the automobile.

Another object is to provide an improved structure of this character which is exceedingly simple, convenient, strong, safe and effective, consistent with a comparatively slight cost of manufacturing.

Other objects and advantages may become apparent to persons who read the following details of description in connection with the accompanying drawings in which:

Figure 1 is a longitudinal sectional view, the section being taken through the axial center of the main body member, the shaft-clamp and the threaded sleeve which actuates the latter.

Fig. 2 is a perspective view of my improved attachment, the retaining sleeve or collar being out of its normal position but in axial alinement with the annular rib or ridge around which it is normally seated.

Fig. 3 is a transverse sectional view along the line 3—3 of Fig. 1.

Fig. 4 is a perspective view of the threaded actuating sleeve and automatic clamp detached.

Fig. 5 is a transverse sectional view along the line 5—5 of Fig. 1.

Referring to these drawings in detail in which similar reference characters correspond with similar parts throughout the several views and in which the shaft or axle A, the casing B, hub-plate C and rear radius rod D are typical of the axle and casing connections of a Ford automobile and are shown merely to illustrate the application and use of the present invention:

The invention comprises a main body member 1, a securing device or flanged sleeve 2 which is provided with apertured lugs 3 and a screw or bolt 4 for removably securing it to the tubular housing 1, a shaft-clamp 6, an actuating sleeve 7, and a combined screw and wedge 8. The member 2 is formed with a pair of apertured arms 5, and bolts 5ª extend through these arms and through alined apertures of the hub-plate and rear radius rods, these bolts replacing the shorter bolts that are ordinarily used to secure the rear ends of these rods D to the hub-plate C. The body 1 comprises a wheel-spindle 9, a socket 10 and an annular shoulder or ridge 11, the interior surface of the socket 10 being inwardly convergent, and the outer surface of the axle clamp being tapered to conform to the interior surface of the socket 10. Moreover, the shaft-clamp 6 is formed of steel or other springy material and is provided with an axially parallel slot 12 which extends entirely from end to end of the axle-clamp so that the latter may be expanded and contracted circumferentially. The inner surface of the member 6 is provided with teeth or sharp corrugations 13, and the internal diameter of this member is normally less than the external diameter of a shaft which this device is intended to clamp. Therefore the member 6 must be expanded before the shaft A can be inserted in this clamping member. The main body is provided with a threaded aperture 14 in which the combined screw and wedge member 8 may have threaded engagement so that its somewhat conical front end may be forced along the slot 12 in such relation as to wedge the walls of this slot away from one another and thereby expand the self-contracting member 6.

The threaded sleeve 7 is in the form of a ring, and its internal diameter is sufficiently great to permit the shaft to be extended therethrough into the axle-clamp 6 when the latter is expanded. The member 7 is provided with a wrench-engaging portion 15 so that it may be forced inward against the resistance of the member 6 when the latter is engaged with the shaft A. Screws 16 are adapted to be seated in alined apertures 17 and 18 of the respective members 1 and 7. However, the screws 16 may be somewhat shorter than those which are shown, and may act merely as set screws against the sleeve 7 for holding it in different adjustments.

Although the body 3 may be formed of a single piece of steel or other hard and strong metal, it is preferable to provide a covering 19 of white metal, Babbitt or other relatively frictionless metal so that the device will rotate with comparative ease within the casing 2.

A nut 20 may be provided upon the threaded outer end of the spindle 9, although this member may be dispensed with when the nut of the broken axle or spindle is obtainable and will fit the threads of this spindle.

In applying my improved attachment to the broken axle 1, the member 6 may be expanded by forcing the wedge portion of the member 8 into the slot 12 while the slotted member 6 is held against longitudinal movement by the sleeve 7, in thus expanding the member 6 it should be understood that the sleeve 7 should have only a few of its threads engaged with those of the member 1, so that the member 6 is disposed within the larger portion of the inwardly tapering socket and is, therefore, capable of being expanded. When the member 6 has been expanded sufficiently to receive the shaft A, the latter is inserted, and the member 8 is then removed to permit the axle-clamp to automatically contract and clamp the axle. The sleeve 7 is now screwed farther into the socket or approximately to the position shown in Fig. 1 and a cam 21 of the member 7 acts against a cam of the member 6 so as to force this member inward and coöperate with the converging sides of the socket to effect a further contraction of the axle-clamp. In thus further contracting, the teeth 13 penetrate the surface of the axle A and effectively prevents rotation independently of the member 6. However, the clamping member 6 has only a frictional engagement with the socket 10 after the member 8 is removed so that when the shaft A is rotated by its motive power, the resistance of the wheel on the spindle 9 may cause a slight rotary movement of the member 6 with relation to the member 1. However, as the member 6 rotates with the shaft A, in the direction of the arrow, the cam surface 22 co-acts with the cam surface 21 for forcing the gripping member 12 farther inward and thereby increasing the clamping efficiency of this member. Referring to Fig. 4, it will be seen that there are two cam surfaces 21 and two cam surfaces 22, and it should be understood that one side of each cam 21 acts upon a corresponding cam 22 for pressing the member 6 inward by rotating the sleeve 7, and that the opposite side of each cam 21 is effective to press the member 6 inward when the latter is rotated while the sleeve 7 remains stationary or under the influence of a resistance against turning.

The sleeve 2 is provided with an inwardly extending annular flange 23 which co-acts with the adjacent end of the casing B for preventing longitudinal or axial movement of the attachment with relation to the casing B, at the same time permitting a free rotary movement of this attachment with relation to the casing B.

An aperture (not shown) may be provided in the casing B for inserting a screw-driver for tightening and loosening screws 16 and for inserting a tool to hold the sleeve 7 while the wheel spindle 9 is rotated for screwing the sleeve 7 inward and outward. Moreover, an additional screw-threaded aperture 14 may be provided (though not shown), so that a screw or other instrument may be inserted for forcing the axle-clamp toward the open end of the socket when it is desired to remove this attachment prior to permanently repairing the broken axle. This second screw-threaded aperture 14 is not needed except when the one shown is alined with the slot 12, for if a solid portion of the member 6 is opposite this slot 14, a screw or other instrument can be inserted through this aperture for dislodging the axle-clamp from its effective position.

Although I have described this embodiment of my invention very specifically, it is not intended to limit this invention to these exact details of construction and arrangement, but changes may be made within the scope of the inventive ideas as implied and claimed.

What I claim as my invention is:

1. In an axle-attachment, a main body comprising a wheel-spindle and a socket, a self-contracting axle-clamp in said socket, and means to increase the contraction and consequent clamping efficiency of said axle-clamp upon rotation of an axle clamped by said axle-clamp.

2. In an axle attachment, a main body comprising a wheel-spindle and a socket, a split sleeve in said socket adapted to receive and frictionally grip a broken axle, said sleeve and socket having coacting means for contracting the former when the socket and sleeve are relatively shifted in a longitudinal direction, and means for so shifting said socket and said sleeve when the latter is turned within the former by the axle.

3. In an axle attachment, a main body comprising a wheel-spindle and a socket, said body having an opening at the bottom of said socket, a self-contracting axle clamp in said socket, and means insertible through said opening to expand said axle clamp and permit the insertion of an axle into the same.

4. In a device of the character described, a main body comprising a wheel-axle and an internally tapering socket, a contractible axle-clamp having an outer tapering surface to conform to the inner surface of the socket and having a cam on its larger end, and a sleeve adapted to permit an axle to extend therethrough into said axle-clamp, said sleeve having threaded engagement with said main body and being provided with a cam which is coöperative with the cam of said axle-clamp and the inwardly tapering surface of said main body for contracting said axle-clamp on an axle.

5. In an axle attachment, a main body comprising a wheel-spindle and socket, a split sleeve in said socket adapted to receive and frictionally grip a broken axle, said sleeve and socket having coacting means for contracting the former around the axle upon relative endwise shifting of said socket and sleeve, and cam means on said socket and sleeve for utilizing any turning of the sleeve within the socket for effecting the aforesaid endwise shifting of said sleeve and socket.

6. The combination of a main body comprising a wheel-spindle, a socket and an annular ridge, a flanged sleeve surrounding said ridge and being attachable to a shaft-housing in the relation for securing said body in rotary but otherwise immovable relation to said housing, a shaft-clamp in said socket, means in said socket to contract said shaft-clamp, and a screw threaded in said main body and operatable to expand said shaft-clamp.

7. An axle attachment comprising a wheel-spindle, a socket on the inner end of said spindle adapted for reception in an axle-housing and to receive the end of a broken axle, means for clamping the socket on the axle, a collar adapted for passage over the end of the axle housing to retain the socket therein, and a lateral arm on said collar having an opening to receive one of the bolts by means of which the well-known rear radius rod is secured to the usual fixed hub plate of the axle housing.

In testimony whereof I have hereunto set my hand.

JULIUS ANTON HAFFNER.